(12) United States Patent
Pardoen et al.

(10) Patent No.: US 7,058,372 B1
(45) Date of Patent: Jun. 6, 2006

(54) METHOD AND APPARATUS FOR AUTOMATIC TUNING OF A RESONANT LOOP ANTENNA

(75) Inventors: Matthijs D. Pardoen, Sunnyvale, CA (US); János Erdélyi, Dunakeszi (HU); Attila Zólomy, Budapest (HU); Ferenc Mernyei, Budapest (HU)

(73) Assignee: Integration Associates Inc., Mountain View, CA (US)

( * ) Notice: Subject to any disclaimer, the term of this patent is extended or adjusted under 35 U.S.C. 154(b) by 621 days.

(21) Appl. No.: 10/286,647

(22) Filed: Nov. 1, 2002

(51) Int. Cl.
*H04B 1/04* (2006.01)
(52) U.S. Cl. ............... 455/125; 455/121; 455/123; 455/115.1; 333/17.3; 333/124; 343/860; 343/861
(58) Field of Classification Search .......... 455/125, 455/121, 123, 119, 126, 115.1, 115.2, 116, 455/113, 114.1, 575.1, 550.1, 425, 424, 13.3, 455/532, 62, 67.11, 71, 77, 561, 117, 575.7, 455/95, 129, 164.2, 161.2, 136–139, 192.1, 455/192.2, 192.3, 193.1–193.3, 78.83, 197.2, 455/197.3, 276.1, 107; 333/17.3, 124, 298, 333/207; 343/860, 861, 850, 858, 852, 700; 375/123, 133, 138, 140, 219, 285, 346, 316, 375/295, 296; 330/107, 129, 207, 298, 302, 330/305, 306, 32, 33
See application file for complete search history.

(56) References Cited

U.S. PATENT DOCUMENTS

| | | | |
|---|---|---|---|
| 3,794,941 A * | 2/1974 | Templin ............... | 333/17.1 |
| 4,493,112 A * | 1/1985 | Bruene ............... | 455/123 |
| 4,713,808 A | 12/1987 | Gaskill et al. | |
| 5,136,719 A | 8/1992 | Gaskill et al. | |
| 5,170,496 A * | 12/1992 | Viereck ............... | 455/121 |
| 5,208,537 A * | 5/1993 | Rietsch et al. ........... | 324/322 |
| 5,404,113 A * | 4/1995 | Nitardy ............... | 330/10 |
| 5,483,680 A * | 1/1996 | Talbot ............... | 455/107 |
| 5,483,688 A | 1/1996 | English et al. | |
| 5,491,715 A * | 2/1996 | Flaxl ............... | 375/344 |

(Continued)

FOREIGN PATENT DOCUMENTS

| | | |
|---|---|---|
| WO | WO 88/05213 A1 | 7/1988 |
| WO | WO 99/05214 A1 | 7/1988 |

OTHER PUBLICATIONS

"ASCell3913 868 MHz, 433 MHz and 315 MHz ISM Band FSK Transmitter," *Preliminary Data Sheet*, Rev. No. D5, Austria Micro Systems (Mar. 2002).

(Continued)

*Primary Examiner*—Edward F. Urban
*Assistant Examiner*—Charles Chow
(74) *Attorney, Agent, or Firm*—Francissen Patent Law, P.C.

(57) ABSTRACT

Disclosed is a circuit and method for continuous automatic tuning of a resonant circuit. A resonance voltage of the resonant circuit is phase shifted by a predetermined phase shift Φ degrees and an input voltage signal to a power amplifier driving the resonant circuit is phase shifted by Φ±90 degrees to place the signals in quadrature. The phase shifted signals are mixed to obtain a error signal. The error signal is compared to a predetermined voltage range in order to generate control signals for a control word generator, such as an up-down counter. The control word generator produces a control word that drives a capacitance bank that is part of the resonant circuit. The present invention continuously automatically adjusts the capacitance of the capacitance bank to tune the resonant circuit.

12 Claims, 4 Drawing Sheets

U.S. PATENT DOCUMENTS

| | | | |
|---|---|---|---|
| 5,564,086 A | * | 10/1996 | Cygan et al. ............... 455/126 |
| 5,673,001 A | * | 9/1997 | Kim et al. ................. 330/284 |
| 6,028,503 A | * | 2/2000 | Preishuberpflugl et al. ........................ 340/10.4 |
| 6,253,068 B1 | | 6/2001 | Elder et al. |
| 2002/0049047 A1 | | 4/2002 | Elder et al. |

OTHER PUBLICATIONS

"TRF4900 Single-Chip RF Transmitter," *Production Data*, Texas Instruments (Jul. 2000; Revised Jan. 2002).

Micrel, Inc., MICRF102 QwikRadio UHF ASK Transmitter Preliminary Information, Mar. 2001, 10 pages.

Micrel, Inc., MICRF103, QwikRadio UHF ASK Transmitter, Final, Jun. 2002, 7 pages.

Micrel, Inc., MICRF104, 1.8, QwikRadio UHF ASK Transmitter, Final Information, Nov. 8, 2001, 10 pages.

Austria Micro Systems, ASCell3913, Preliminary data Sheet, Mar. 2002, 18 pages.

Single-chip Transmitter Tunes Its Own Antenna, www.electronicstalk.com, May 7, 2001, 2 pages.

MICRF005/103: QuikRadio 800-1000MHz Tx-Rx Pair Handle 115kbps Data-Rate, www.analogzone.com, Oct. 14, 2002, 2 pages.

Transmitter Keeps in Tune with Loop Antennas, EETimesUK.com, Mar. 30, 2001, 2 pages.

* cited by examiner

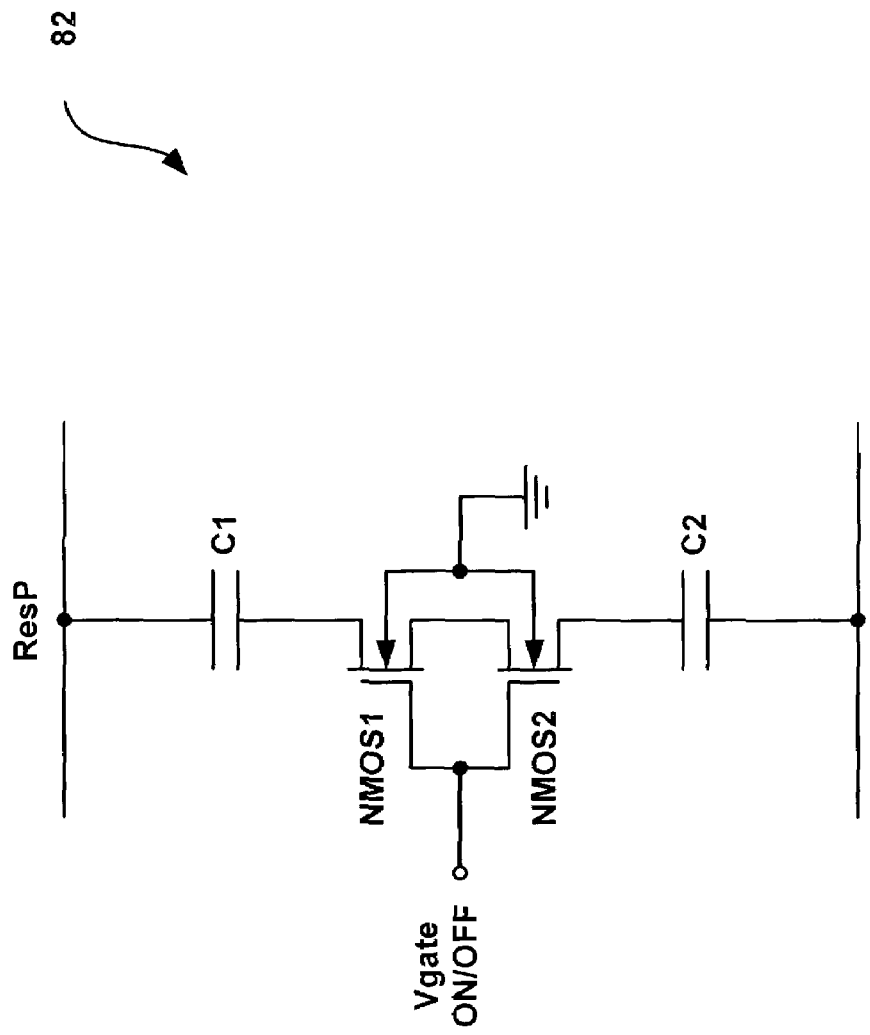

METHOD AND APPARATUS FOR AUTOMATIC TUNING OF A RESONANT LOOP ANTENNA

FIELD OF THE INVENTION

The present invention relates to transmitter circuits. More specifically, it relates to automatic tuning of an integrated loop antenna system of a transmitter circuit.

BACKGROUND OF THE INVENTION

A generally license free frequency band called the industrial-scientific-medical (ISM) band has emerged for short range low power applications, such as industrial controls, telemetry and low power data transmission. A range of frequencies from 300 MHz to 1 Ghz is generally provided for ISM. For example, the European ISM standard provides for operation at 433 MHz and at frequencies ranging from 800 MHz to 930 MHz. The US ISM standard provides for a band at 300 MHz and in a range from 902 MHz to 928 MHz. An ISM transmitter may, therefore, need to operate at more than one carrier frequency. The transmitter's carrier frequency $f_c$ is typically determined by a reference frequency $f_{ref}$ from a reference crystal. A range of carrier frequency values, e.g. ranging from 800 MHz to 930 MHz, can be achieved by synthesizing the carrier frequency from the reference frequency to obtain the carrier frequency. For example, a phased-lock-loop (PLL) synthesizer may be used to synthesize the carrier frequency from the reference frequency.

Examples of applications for ISM transmitters include: security alarms, telemetry, environment control systems, wireless data repeaters, personal/patient data logging, access and movement monitoring, remote metering, barcode readers, wireless keyboard and mouse, remote keyless entry, remote tire pressure control, garage door openers, and doorbells.

U.S. Pat. No. 6,253,068 issued on Jun. 26, 2001 to Elder et al. discloses an example of a fully integrated all-CMOS AM transmitter with automatic antenna tuning. In the disclosed system, the antenna serves as a resonator for the oscillator block within the phase-lock-loop (PLL). By using the antenna as the resonator, Elder et al. automatically provides that a tuning varactor in the resonant circuitry to receive the proper tuning voltage in order to tune the antenna (VCO resonator) to the desired frequency. However, since continuous tuning is necessary for the PLL, only varactors can be used, which require higher voltage levels that place a relatively high minimum limit on the supply voltage and the signal amplitude on the antenna. Further, any mistuning effects that may occur due to the antenna may cause the oscillator to fall out of the tuning range of the PLL thereby disrupting oscillation and causing the circuit to cease functioning.

U.S. Pat. Nos. 5,136,719 and 5,483,688 describe an approach for antenna tuning that works for small signals that are suitable for use in receiver circuits rather than transmitter circuits. The tuning elements used in these patents are varactors, which require a relatively high minimum supply voltage because a decoupling capacitor is required in order to control the tuning elements.

U.S. Pat. No. 5,136,719 issued on Aug. 4, 1992 to Gaskill et al. discloses another automatic antenna tuning method and apparatus. In Gaskill et al. system, an antenna receives radio frequency signals in a desired reception band from 88 to 108 MHz. The antenna is automatically tuned to receive packets of information on a periodic basis. During a tuning mode, the control circuit sweeps a varactor biasing voltage over its full range to measure an optimum level. To determine the optimum tuning condition, a control circuit receives from a receiver subsystem a Received Signal Strength Indicator (RSSI) signal that is indicative of received signal strength. Once the sweep is concluded, the system sets the tuning element, and hence the antenna, to the value that produced the maximum RSSI signal. A packet of information is then received and passed to a protocol decoder to decode the information. The method of Gaskill et al., however, the antenna tuning approach lacks an adaptive capability with respect to changes in the device environment or in component selection. Further, overall system requirements typically impose certain time limitations on the time available for the antenna tuning procedure, which therefore impose limitations on the accuracy of the antenna tuning procedure as set forth under the Gaskill method.

U.S. Pat. No. 5,483,688 issued on Jan. 9, 1996 to English et al. discloses still another method and apparatus for automatically tuning an adaptive antenna. A predictor value is used to establish an antenna tuning voltage sub-range that is most likely to contain the optimum antenna tuning voltage, where the sub-range is a smaller range than the full antenna tuning voltage range. The antenna tuning voltage sub-range is then traversed while monitoring a signal strength indicator to identify an antenna tuning voltage providing optimum tuning conditions, which improves the execution time and accuracy of the antenna tuning.

Another approach to antenna tuning is found in the ASCell3913 868 MHz, 433 MHz and 315 MHz ISM Band FSK Transmitter from Austria Micro Systems (AMS). (See the ASCell3913 Preliminary Data Sheet, Rev. No. D5, March 2002, incorporated by reference in its entirety.) The ASCell3913 solution uses three capacitance values to tune an antenna. Antenna tuning is allowed for only a short period when the transmitter is powered-up. The resulting state of the tuning circuit is maintained for the duration of the transmission session. This solution has a limited accuracy due to the reduced number of capacitance cells and cannot follow changes in conditions that may occur during long transmission periods.

SUMMARY OF THE INVENTION

The present invention is directed towards to a method and apparatus for automatically tuning an integrated loop antenna tuning system that may operate under low operating voltage supply levels and with a high output signal level.

An embodiment of a continuous automatic tuning circuit, according to the present invention, for a transmitter circuit having a resonant circuit that includes an antenna and a power amplifier for driving the resonant circuit, includes a capacitance bank coupled between the power amplifier and the resonant circuit. The capacitance bank has an input that is coupled to an output of the power amplifier, an output that is coupled to the resonant circuit, and a control input, where a capacitance of the capacitance bank is determined by a control word received at the control input. The tuning circuit also includes a first phase shifter having an input coupled to the input of the capacitance bank, where the first phase shifter is configured to phase shift a resonance signal received at the input of the second phase shifter by a predetermined phase shift amount ($\Phi$) in order to generate a first phase shifted signal at an output of the first phase shifter. A second phase shifter has an input coupled to the input of the power amplifier, where the second phase shifter is configured to phase shift an input signal received at the input of the second phase shifter by the predetermined phase shift amount plus or minus ninety degrees (Φ±90) in order to generate a second phase shifted signal at an output of the second phase shifter. The circuit further includes a mixer having a first input coupled to the output of the first phase shifter, a second input coupled to the output of the second phase shifter, and an output, where the mixer is configured to mix the first phase shifted signal and the second phase shifted signal in order to generate an error signal at an output of the mixer. A control word generator of the circuit has an input coupled and an output coupled to the control input of the capacitance bank, where the control word generator is configured to generate the control word at the output of the control word generator responsive to a control signal received at the input of the control word generator. Finally, a compare and control circuit of this embodiment has an input coupled to the output of the mixer, where the compare and control circuit is configured to generate a control signal at an output of the compare and control circuit responsive to the error signal, where the control signal is configured to drive the control word generator in order to adjust the control word.

In a further refinement of the embodiment of a continuous automatic tuning circuit, according to the present invention, the compare and control circuit includes a first comparator having a first input coupled to the output of the mixer, a second input for receiving a first comparison voltage signal, and an output and a second comparator having a first input coupled to the output of the mixer, a second input for receiving a second comparison voltage signal, and an output. This refinement includes combinational logic circuitry having a first input coupled to the output of the first comparator and a second input coupled to the output of the second comparator, where the combinational logic circuitry is configured to generate an UP signal of the control signal at a first output and a DOWN signal of the control signal at a second output responsive to the signals output from the first and second comparators. In this refinement, the control word generator is a counter having a first input coupled to the first output of the combinational logic circuitry, a second input coupled to the second output of the combinational logic circuitry, and a clock input for receiving a clock signal, where the counter is configured to increase a value of the control word responsive to the UP signal and the clock signal and decrease a value of the control word responsive to the DOWN signal and the clock signal.

An embodiment of a method, according to the present invention, for continuously automatically tuning a resonant circuit that includes an antenna, the resonant circuit being part of transmitter having a power amplifier for driving the resonant circuit, calls for providing an adjustable capacitance as part of the resonant circuit. The method also sets forth phase shifting a resonance signal of the resonant circuit by a predetermined phase shift amount (Φ) in order to generate a first phase shifted signal and phase shifting an input signal to the power amplifier by the predetermined phase shift amount plus or minus ninety degrees (Φ±90) in order to generate a second phase shifted signal. The method then calls for mixing the first and second phase shifted signals to obtain an error signal and adjusting a capacitance of the adjustable capacitance responsive to the error signal in order to tune the resonant circuit. In a further refinement of this embodiment of a method according to the present invention, the step of adjusting a capacitance of the adjustable capacitance responsive to the error signal in order to tune the resonant circuit further involves comparing the error signal to a first comparison signal to generate a first out-of-tune signal and comparing the error signal to a second comparison signal to generate a second out-of-tune signal. This refinement then calls for converting the first and second out-of-tune signals into UP and DOWN signals, adjusting a control word responsive to the UP and DOWN signals, and activating and deactivating elements of the adjustable capacitance using the control word.

BRIEF DESCRIPTION OF DRAWINGS

The present invention is described herein with reference to the accompanying drawings, in which like numerals designate corresponding parts in the figures, wherein:

FIG. 3B is a circuit diagram illustrating an embodiment of a capacitance cell of the capacitance bank of FIG. 3A.

DETAILED DESCRIPTION OF THE PRESENT INVENTION

The present invention is directed toward a method and apparatus for tuning small resonant loop antennas.

To minimize the current consumption, external component count and size of an RF transmitter it is desirable to directly drive an integrated loop antenna having high input impedance. Small loop antennas need tuning capacitance to obtain antenna resonance at a desired operating frequency in order to improve radiation efficiency. The desired resonant frequency for a circuit may be affected by variations in integrated circuit processes, circuit packaging, and PCB manufacturing tolerances.

The antenna tuning circuit and method of the present invention identifies a de-tuned condition and acts in order to minimize the detuning. The present invention works on the principle that, when in resonance, the resonant voltage ($V_{res}$) and antenna current ($I_{ant}$) on the complete resonator (antenna, package, plus tuning capacitance) are in phase. If a phase shift is observed, then an error signal (proportional to the phase error) is generated. The error signal is evaluated by a control circuit, which controls the tuning capacitance in response to the error signal. The tuning capacitance is provided by a capacitance bank that operates as a load on the loop antenna.

Figure 1:
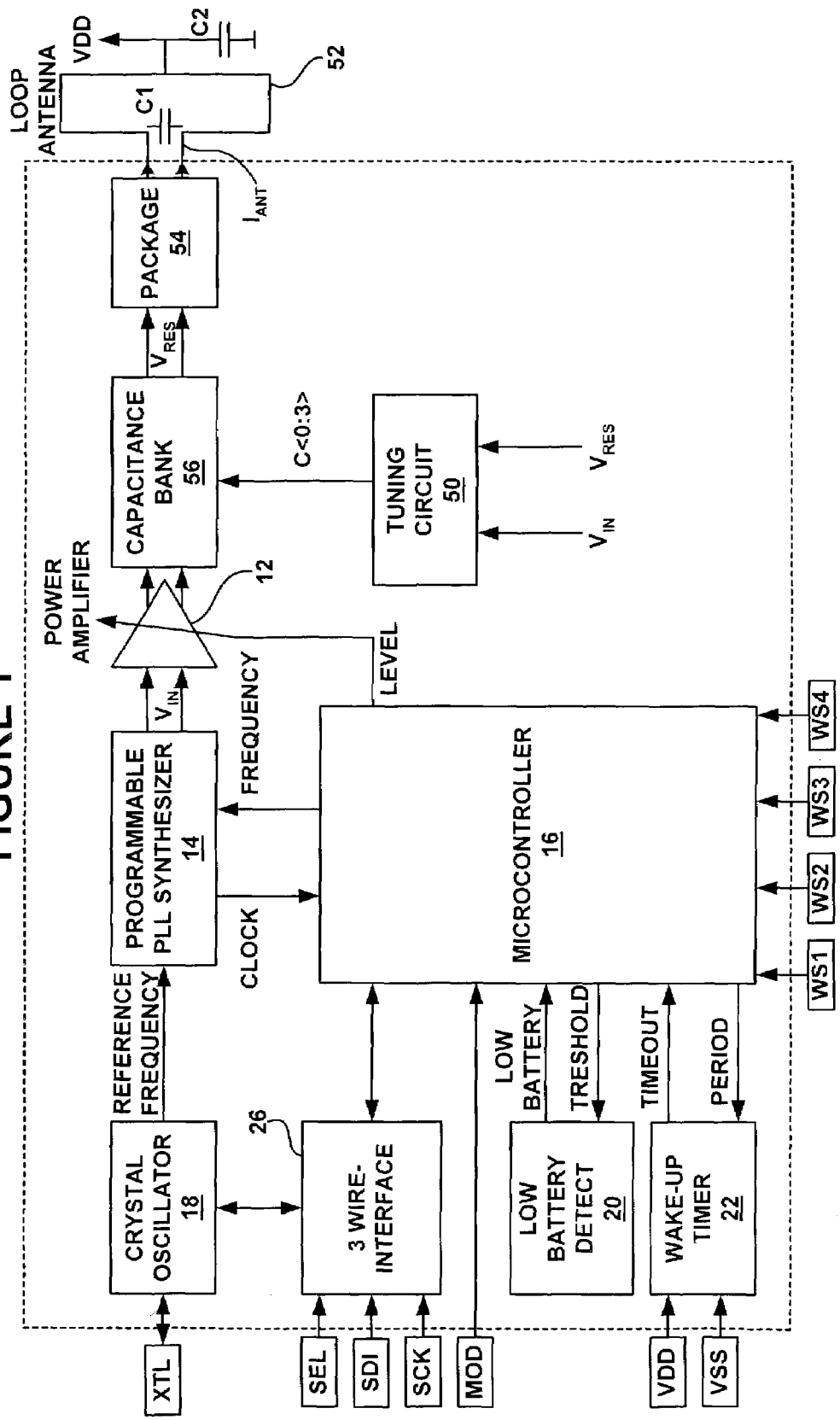
FIG. 1 is a functional block diagram illustrating an example of a low power ISM band Frequency Shift Keying (FSK) transmitter suitable for application of the present invention.

FIG. 1 is a functional block diagram illustrating an example of a low power ISM band Frequency Shift Keying (FSK) transmitter 10 suitable for application of the present invention. The transmitter 10 is a direct FSK modulated transmitter designed to comply with the applicable FCC and ETSI standards. The transmitter 10 is configured to support a wide range of operating bands, such as 915 MHz, 868 Mhz, 433 MHz, and 315 MHz. In each frequency band, the transmitter 10 may be programmed digitally. For multi-channel or frequency-hopping applications, the frequency of the transmitter 10 may be changed under the control a microcontroller 16, as discussed further below.

In FIG. 1, the FSK transmitter includes a small loop antenna 52, which is either a closed or open antenna, that is coupled to a package contact 54, such as a pad or pin. The antenna 52 is also coupled a capacitance bank 56 and the antenna 52, package contact 54 and capacitance bank 56 combine to form a complete resonator. A power amplifier 12 of the transmitter 10 has an open-collector differential output to drive the antenna 52 with a programmable output level controlled by microcontroller 16.

A programmable phase-lock-loop (PLL) synthesizer 14 is coupled to power amplifier 12 and determines the carrier frequency of the transmitter. The carrier frequency is synthesized from a reference frequency provided by an on-chip crystal controlled reference oscillator 18. The PLL synthesizer 14 allows the usage of multiple channels in any of the bands. The FSK deviation is selectable to accommodate various bandwidth, data rate and crystal tolerance requirements and it is also high accurate due to the direct close-loop modulation of the PLL 14.

Microcontroller 16 performs the overall control functions associated with the operation of the transmitter 10. Microcontroller 16 receives a series of digital inputs from a three-wire serial interface 26 to allow a user to select, for example, the operating frequency band and the center frequency of the PLL synthesizer 14, the polarity and deviation of the FSK modulation and the output level to drive the small loop antenna 52. In this example, data bits on pin SDI are shifted into the microcontroller upon rising edge of the clock on pin SCK when the chip select pin SEL is low. External capacitor C1 is a fixed capacitance that is part of the resonant circuit and may be selected in order to determine the frequency band of the transmitter. External capacitor C2 is a fixed capacitance that is not part of the resonant circuit and is typically included to ensure an AC ground connection.

In simple applications, the on-chip digital controller allows the transmitter 10 to directly interface a serial electrically erasable programmable read-only memory (EEPROM). The different wake-up events will initiate automatic readout of the assigned command sequence from the memory. All settings and the transmitted code can be programmed without the use of a microcontroller 16.

Figure 2:
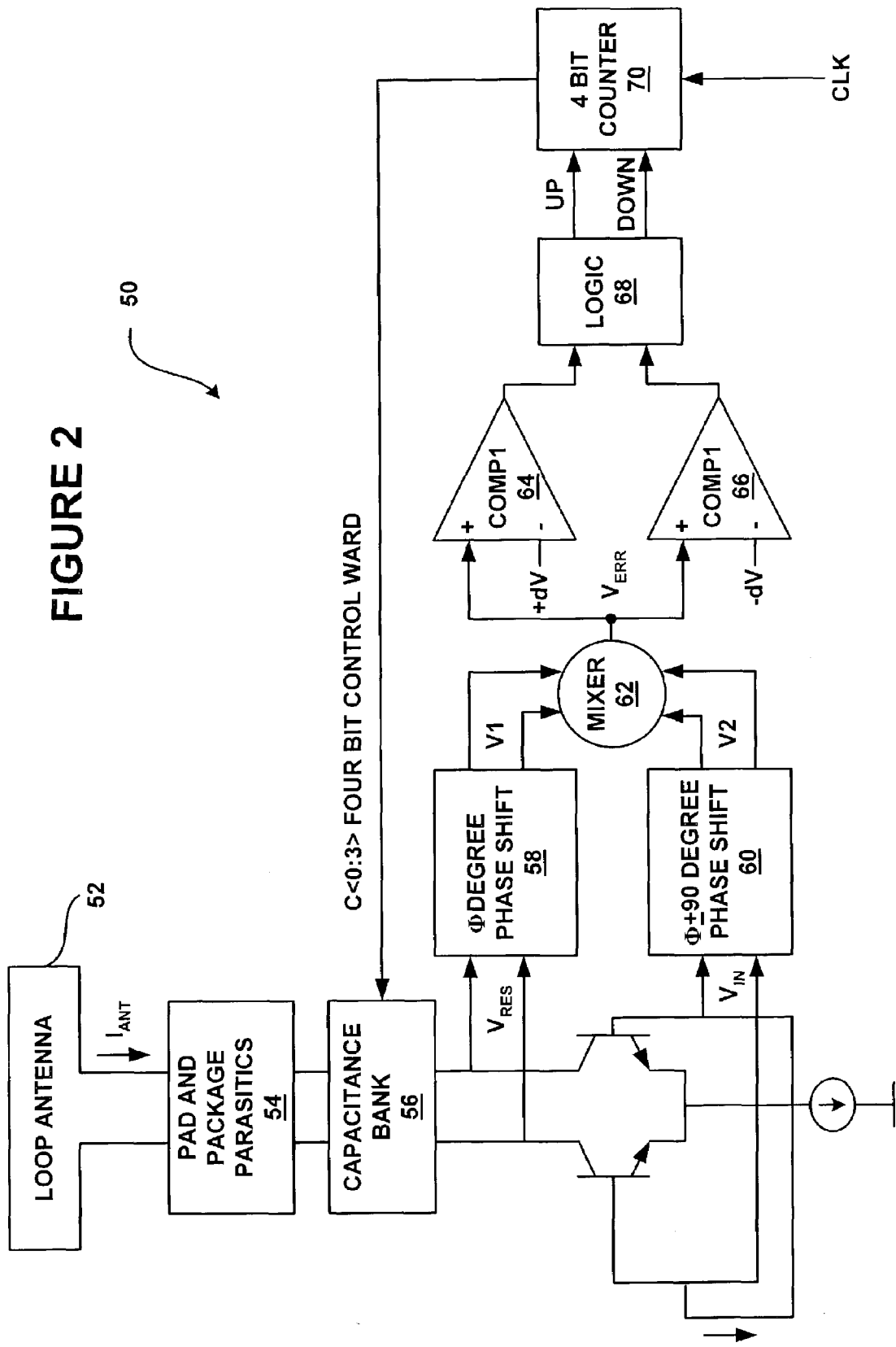
FIG. 2 is a functional block diagram illustrating an embodiment of an antenna tuning circuit according to the present invention.

FIG. 2 is a functional block diagram illustrating an embodiment of an automatic antenna tuning circuit according to the present invention. The tuning circuit 50 controls capacitive bank 56 in response to an input voltage $V_{IN}$ input to power amplifier 12 and the resonant voltage $V_{RES}$ at the input to capacitance bank 56. As noted above, the capacitive bank 56 combines with the loop antenna 52 and the pad and package parasitics 54 to form a resonant circuit.

Tuning circuit 50 includes a pair of phase shifters 58 and 60 and a mixer 62. Phase shifter 58 shifts a phase of the resonant voltage $V_{RES}$ by $\Phi$ degrees to produce voltage signal $V_1$. Likewise, phase shifter 60 shifts a phase of the input voltage $V_{IN}$ by $\Phi \pm 90$ degrees to produce voltage signal $V_2$. $V_1$ and $V_2$ are input to mixer 62 to produce error voltage signal $V_{ERR}$. The error voltage signal $V_{ERR}$ is then input to a compare and control circuit. The compare and control circuitry is configured to generate a control signal that adjusts the capacitance of the capacitive bank based upon the $V_{ERR}$ and $V_{IN}$ signals, thus forming a feedback control loop. In one embodiment, the compare and control logic is composed of comparators 64 and 66, combinational control logic 64, and a 4-bit counter 70.

The use of mixer 62 in the tuning control circuit 50 exploits an inherent property of mixers: if signal with identical frequencies are mixed, then the resulting DC voltage is related to the phase difference of the input signals. The DC output voltage from the mixer, e.g. $V_{ERR}$, is zero if the input signals different by 90 degrees, e.g. in quadrature. The voltage signals $V_1$ and $V_2$ must be placed in quadrature to one another through phase shifting in order to take advantage of this inherent property of mixers. In this embodiment, $V_{IN}$ is phase shifted by $\Phi \pm 90$ degrees to produce voltage signal $V_2$ that is in quadrature with $V_1$. As is well understood in the art, other combinations of phase shifts may be used to place $V_1$ and $V_2$ in quadrature with one another. In one embodiment of the present invention, the mixer 62 is realized as a standard Gilbert-Cell.

Since the current in the resonant loop $I_{ANT}$ is in-phase with the input voltage of the power amplifier $V_{IN}$, the phases of $V_{RES}$ and $V_{IN}$ are evaluated. To obtain a zero error voltage $V_{ERR}$ at the mixer output 62 when $V_{RES}$ and $V_{IN}$ are in-phase, a 90 degree relative phase difference must be implemented using phase shifters 58 and 60. This means that $V_1$ and $V_2$ may have a 90 degree phase difference, e.g. a quadrature relationship, when $V_{RES}$ and $V_{IN}$ (i.e. $I_{ANT}$ and $V_{RES}$) are in-phase.

The phase shifters 58 and 60 may be realized as multi-section P/C and C/R dividers to provide a wide operating frequency range. The $\Phi$-degree phase shifter 58 may be zero degrees. For the protection of circuitry, however, a phase shift of $\Phi=45$ degrees may also be a suitable selection for certain embodiments of the present invention.

The compare and control logic monitors error voltage $V_{ERR}$ and, responsive thereto, increments or decrements counter 70 in order to generate a control word C<0:3> that drives capacitance bank 56. In one embodiment of the invention, two comparators 64 and 66 compare the DC error voltage $V_{ERR}$ from the mixer output 62 to predetermined comparison voltage levels +dV and −dV in order to generate out-of-tune signals that indicate that the resonant circuit is sufficiently out of tune to require correction. The output signals of the comparators determine the state of the UP and DOWN signals generated by the combinational logic circuit 68, as illustrated in the following table:

| $V_{ERR}$ | Comparator 64 | Comparator 66 | UP | DOWN | Counter change |
|---|---|---|---|---|---|
| $V_{ERR} < -dV$ | Low | Low | High | Low | +1 |
| $-dV < V_{ERR} < +dV$ | Low | High | Low | Low | 0 |
| $V_{ERR} > +dV$ | High | High | Low | High | −1 |

If the error voltage $V_{ERR}$ is below −dV, then counter 70 increases the value of the C<0:3> digital control word. If the error voltage $V_{ERR}$ is above +dV, then counter 70 decreases the value of the C<0:3> digital control word. If the error voltage is between the limits of +dV and −dV, then the value of the digital control word will not change. Thus, the counter will never overflow, i.e. if it reaches 15 it will stay there as long as a decrease is not requested. Likewise, if counter 70 reaches 0, then it will stay at that value so long as an increase is not requested.

In the embodiment shown in FIG. 2, a 4-bit counter 70 is utilized as a control word generator to generate a 4-bit digital control word C<0:3>, where counter 70 is running from a divided system clock signal such as 10/8 MHz. The number of bits in the counter and in the control word may be varied to meet the requirements of the particular application or implementation, e.g. an n-bit counter is used to implement an n-bit control word C<0:n−1>. If the error voltage $V_{ERR}$ is within the predetermined range +/−dV, then the transmitter circuit is in a "well tuned condition" and the value of the digital control word for the capacitance bank 56 remains stable, e.g. 0. If the error voltage falls below −dV, then the UP signal becomes active and counter 70 increases the value of the digital control word C<0:3> to +1. On the other hand, if the error voltage goes above +dV, then the DOWN signal becomes active and counter 70 decreases the value of the C<0:3> digital control word to −1, e.g. 15. Using a divided system clock signal to drive the counter 70 provides a refractory time period for the transmitter circuit to settle any transients caused by a change in the state of capacitor bank 56 so that the control loop remains stabilized and does not attempt to respond to the transients.

Figure 3A:
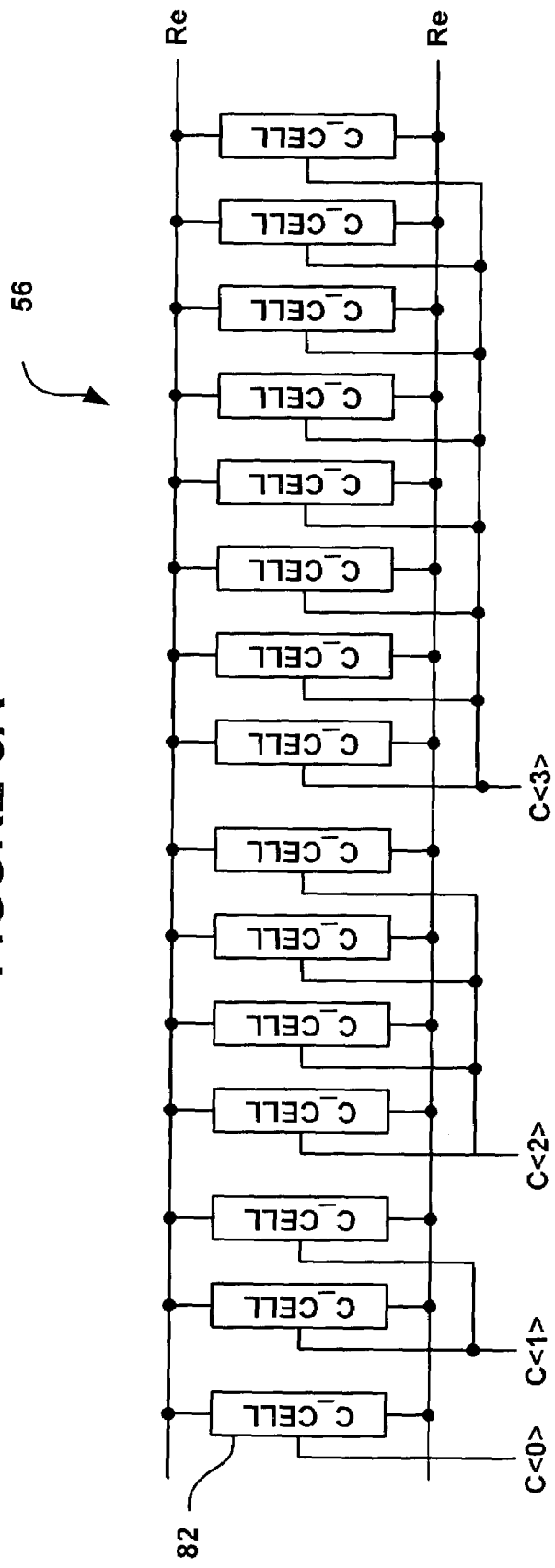
FIG. 3A is a functional block diagram illustrating an embodiment of the capacitance bank of FIG. 2.

FIGS. 3A–B illustrate one embodiment of a capacitance bank 56 and a capacitance cell 82 for use with the present invention. In the embodiment of FIG. 3A, capacitance bank 56 includes groups of capacitance cells, e.g. capacitance cell 82, where the number of cells in each group is determined, in this embodiment, by exponential progression corresponding to the order of the control bit of the control word that drives the group. Thus, in this embodiment, control word bit C<0> drives a single cell, e.g. $2^0=1$. Control word bit C<1> drives two cells, e.g. $2^1=2$. Control word bit C<2> drives four cells, e.g. $2^2=4$. Control word bit C<3> drives eight cells, e.g. $2^3=8$. Other schemes, such as a linear increase obtained using individual capacitance cells and a shift register to generate the control word, may be possible depending upon the requirements of the particular application.

FIG. 3B illustrates an embodiment of a capacitance cell 82 of the capacitance bank 56 of FIG. 3A. Capacitance cell 82 has two capacitances C1 and C2 and switching MOS transistors NMOS1 and NMOS2. The resulting capacitance cell 82 is able to operate at low power supply levels, which may increase the tuning range and increase the amplitude available for the output signal of the transmitter. Because, in the embodiment shown, the power amplifier 12 and the loop antenna 52 are symmetrical circuits, the capacitance cell 82 may be implemented as a symmetrical circuit.

The capacitance cell 82 consists of two states: ON and OFF states. During ON state the cell 82 provides a high capacitance value and may result a low capacitance value while in the OFF state. The OFF state capacitance is determined by the size of the switching MOS transistors NMOS1 and NMOS2. Due to the parasitic drain-bulk and drain-gate capacitances in series with the main capacitors, the OFF state capacitance is obtained. As the MOS transistors NMOS1 and NMOS2 get smaller, then the OFF state capacitance may be smaller and larger ON/OFF capacitance ratio may be obtained. During the ON state, the quality factor of the capacitance cell 82 may be determined by the on resistance of the MOS transistor NMOS1, which is lower with larger devices. The size of the MOS device is therefore selected to keep both the quality factor and the ON/OFF capacitance ratio high.

Instead of the capacitance cell 82, variable capacitors (varactors) may be used. However, varactors may not operate at low power supply levels, which may reduce the tuning voltage of the capacitance bank using varactors. In addition, the use of varactors may also limit the allowed signal amplitude due to the large AC amplitude that may result from a forward biased condition on the DC-wise reverse biased varactors.

The continuous operation and the several states of the capacitance bank 56 allow a fast reaction to any changes during transmission with small steps in the whole resonant system. Having small capacitance steps provided by the capacitance bank 56 the tuning of a resonant circuitry gets even with high quality factor. The number of the necessary ON state capacitance cells is defined by the value of the C<0:n−1> control word, which is updated continuously during transmission in order to minimize the error signal $V_{ERR}$. If the operating frequency changes, or any detuning effect occurs during operation, then the tuning control circuit automatically follows the changes and maintains the resonance of the transmitter at the desired frequency.

In view of the wide variety of embodiments to which the principles of the present invention can be applied, it should be understood that the illustrated embodiments are exemplary only, and should not be taken as limiting the scope of the present invention. For example, a variety of circuit elements may be utilized to perform certain functions of the present invention. Also, the function of some circuit elements may be combined into a single device while the function of other circuit elements may be implemented so as to be performed by multiple devices. Further, the tuning control circuit and method of the present invention may be applied to a variety of transmitter types where resonance control is advantageous.

We claim:

1. A continuous automatic tuning circuit for a transmitter circuit having a resonant circuit that includes an antenna and a power amplifier for driving the resonant circuit, the automatic tuning circuit comprising:

a capacitance bank coupled between the power amplifier and the resonant circuit, the capacitance bank having an input that is coupled to an output of the power amplifier, an output that is coupled to the resonant circuit, and a control input, where a capacitance of the capacitance bank is determined by a control word received at the control input;

a first phase shifter having an input coupled to the input of the capacitance bank, where the first phase shifter is configured to phase shift a resonance signal received at the input of the second phase shifter by a predetermined phase shift amount ($\Phi$) in order to generate a first phase shifted signal at an output of the first phase shifter;

a second phase shifter having an input coupled to the input of the power amplifier, where the second phase shifter is configured to phase shift an input signal received at the input of the second phase shifter by the predetermined phase shift amount plus or minus ninety degrees ($\Phi \pm 90$) in order to generate a second phase shifted signal at an output of the second phase shifter that is substantially in quadrature with the first phase shifted signal;

a mixer having a first input coupled to the output of the first phase shifter, a second input coupled to the output of the second phase shifter, and an output, where the mixer is configured to mix the first phase shifted signal and the second phase shifted signal in order to generate an error signal at an output of the mixer;

a control word generator having an input coupled and an output coupled to the control input of the capacitance bank, where the control word generator is configured to generate the control word at the output of the control word generator responsive to a control signal received at the input of the control word generator; and a compare and control circuit having an input coupled to the output of the mixer, where the compare and control circuit is configured to generate a control signal at an output of the compare and control circuit responsive to the error signal, where the control signal is configured to drive the control word generator in order to adjust the control word.

2. The continuous automatic tuning circuit of claim 1, where the compare and control circuit comprises:

a first comparator having a first input coupled to the output of the mixer, a second input for receiving a first comparison voltage signal, and an output;

a second comparator having a first input coupled to the output of the mixer, a second input for receiving a second comparison voltage signal, and an output; and combinational logic circuitry having a first input coupled to the output of the first comparator and a second input coupled to the output of the second comparator, where the combinational logic circuitry is configured to generate an UP signal of the control signal at a first output and a DOWN signal of the control signal at a second output responsive to the signals output from the first and second comparators; and where the control word generator comprises a counter having a first input coupled to the first output of the combinational logic circuitry, a second input coupled to the second output of the combinational logic circuitry, and a clock input for receiving a clock signal, where the counter is configured to increase a value of the control word responsive to the UP signal and the clock signal and decrease a value of the control word responsive to the DOWN signal and the clock signal.

3. The continuous automatic tuning circuit of claim 1, where the capacitance bank comprises a plurality of capacitance cells, where the capacitance cells are grouped into sets of cells separately controlled by each bit of the control word, where a number of cells in each set of cells corresponds to a magnitude of the corresponding bit of the control word within the control word.

4. The continuous automatic tuning circuit of claim 3, where the power amplifier has a differential output pair and where each capacitance cell comprises:

a pair of transistors coupled in series with one another, where a control terminal of each of the transistors is driven by the corresponding bit of the control word for the cell;

a first capacitor coupled between a first one of the differential output pair and the pair of transistors; and a second capacitor coupled between a second one of the differential output pair and the pair of transistors.

5. A method for continuously automatically tuning a resonant circuit that includes an antenna, the resonant circuit being part of transmitter having a power amplifier for driving the resonant circuit, the method comprising the steps of:

providing an adjustable capacitance as part of the resonant circuit;

phase shifting a resonance signal of the resonant circuit by a predetermined phase shift amount (Φ) in order to generate a first phase shifted signal;

phase shifting an input signal to the power amplifier by the predetermined phase shift amount plus or minus ninety degrees (Φ±90) in order to generate a second phase shifted signal that is substantially in quadrature with the first phase shifted signal;

mixing the first and second phase shifted signals to obtain an error signal; and adjusting a capacitance of the adjustable capacitance responsive to the error signal in order to tune the resonant circuit.

6. The method of claim 5, where the step of adjusting a capacitance of the adjustable capacitance responsive to the error signal in order to tune the resonant circuit further comprises:

comparing the error signal to a first comparison signal to generate a first out-of-tune signal;

comparing the error signal to a second comparison signal to generate a second out-of-tune signal;

converting the first and second out-of-tune signals into UP and DOWN signals;

adjusting a control word responsive to the UP and DOWN signals; and activating and deactivating elements of the adjustable capacitance using the control word.

7. The method of claim 6, where the step of activating and deactivating elements of the adjustable capacitance using the control word includes:

grouping elements of the adjustable capacitance in exponentially increasing numbers of elements; and controlling each group of elements of the adjustable capacitance using a bit of the control word having a magnitude corresponding to the exponential number of elements in the group of elements.

8. The method of claim 7, the method includes the step of providing active devices in each element of the adjustable capacitance and the step of controlling each group of elements of the adjustable capacitance using a bit of the control word having a magnitude corresponding to the exponential number of elements in the group of elements includes driving a gate of the active devices in each element with the bit of the control word having a magnitude corresponding to the exponential number of elements in the group of elements.

9. A continuous automatic tuning system for continuously automatically tuning a resonant circuit that includes an antenna, the resonant circuit being part of transmitter having a power amplifier for driving the resonant circuit, the system comprising:

means for providing an adjustable capacitance as part of the resonant circuit;

means for phase shifting a resonance signal of the resonant circuit by a predetermined phase shift amount (Φ) in order to generate a first phase shifted signal;

means for phase shifting an input signal to the power amplifier by the predetermined phase shift amount plus or minus ninety degrees (Φ±90) in order to generate a second phase shifted signal that is substantially in quadrature with the first phase shifted signal;

means for mixing the first and second phase shifted signals to obtain an error signal; and means for adjusting a capacitance of the adjustable capacitance responsive to the error signal in order to tune the resonant circuit.

10. The system of claim 9, where the means for adjusting a capacitance of the adjustable capacitance responsive to the error signal in order to tune the resonant circuit further comprises:

means for comparing the error signal to a first comparison signal to generate a first out-of-tune signal;

means for comparing the error signal to a second comparison signal to generate a second out-of-tune signal;

means for converting the first and second out-of-tune signals into UP and DOWN signals;

means for adjusting a control word responsive to the UP and DOWN signals; and means for activating and deactivating elements of the adjustable capacitance using the control word.

11. The system of claim 10, where the means for activating and deactivating elements of the adjustable capacitance using the control word includes elements of the adjustable capacitance grouped in exponentially increasing numbers of elements, where each group of elements of the adjustable capacitance is controlled using a bit of the control word having a magnitude corresponding to the exponential number of elements in the group of elements.

12. The system of claim 11, where each element of the adjustable capacitance includes active devices and where a gate of the active devices in each element is driven with the bit of the control word having a magnitude corresponding to the exponential number of elements in the group of elements.

* * * * *